June 6, 1967 A. SERRATTO 3,323,584
INDUCTION TYPE FOUR-PIPE AIR CONDITIONING SYSTEM
Filed July 14, 1964
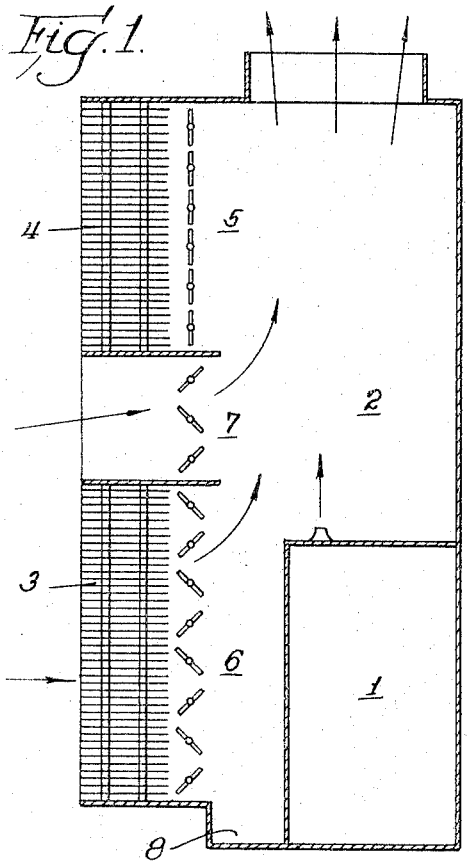
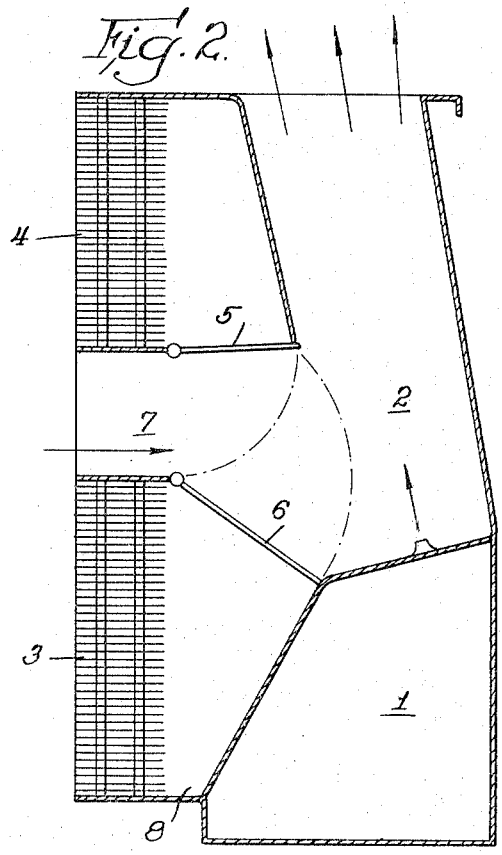
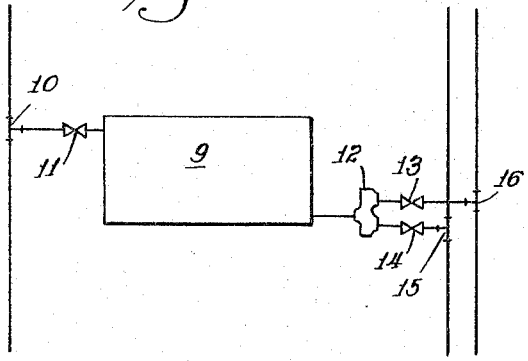
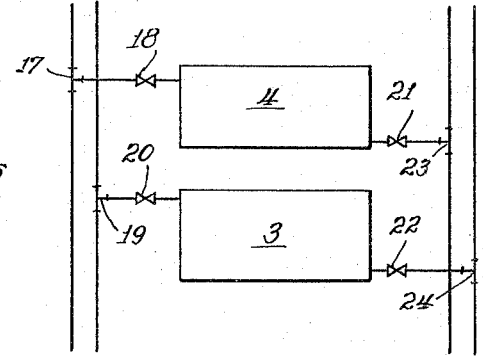
Inventor
ANGELO SERRATTO

United States Patent Office 3,323,584
Patented June 6, 1967

3,323,584
INDUCTION TYPE FOUR-PIPE AIR
CONDITIONING SYSTEM
Angelo Serratto, 10 Piazza Nevelli, Milan, Italy
Filed July 14, 1964, Ser. No. 382,592
5 Claims. (Cl. 165—103)

This invention relates to an induction type air conditioning system, fitted with four pipes.

Actually, an induction type installation is based on the possibility of varying, as desired, the temperature of the several rooms served by a single conditioning installation, without changing the deliveries of primary air coming from a central conditioner, while varying the quantity of secondary hot and cold water circulating in thermic exchange coils appertaining to local induction type conditioners.

Instead, this invention is mainly based on the possibility of varying the temperature of the several rooms within considerable limits without changing the quantities of hot and cold water circulating in the thermic exchange coils of local induction conditioners or the quantity of the primary air.

The local induction type unit appertaining to the system according to this invention permits operating as described above, inasmuch as each induction unit is fitted with two thermic exchange coils laid out in parallel with an interposed neutral section or by-pass through which cooled or hot water flow respectively. Flow of secondary air through the coils is adjusted by a suitable air damper action.

In order to better understand this invention, reference is made to the attached drawing, in which:

FIG. 1 is a functional diagram of the device according to the present invention;

FIG. 2 is a functional diagram of a variant of the system according to the present invention;

FIG. 3 is a scheme of a three-pipe connection of the prior art; and

FIG. 4 is a functional diagram of a four-pipe connection system according to the present invention.

In the diagram of FIG. 1 the pneumatic section intended for regulation and silencing of primary air current treated centrally is indicated by reference numeral 1.

The primary air then comes out through nozzles of annular section, made of metal or other suitable material, instead of circular section as in the prior art, so as to obtain a greater induction ratio. Said nozzles are fitted in induction chamber 2 where, on account of kinetic dissipation, the primary air induces room or secondary air that, in order to reach induction chamber 2, is compelled to pass through hydraulic sections 3 and 4 destined to cool or heat secondary air. The section formed by two thermic exchange coils fitted in parallel has cooled water flowing through one coil 3 and hot water through the other 4. Flow of secondary hot or cold air through coils is adjusted by two air dampers 5 and 6.

Further a third air damper 7 opens when one of the other two (5 and 6) closes, consequently having air damper 6 fully open and, if a higher temperature is required, damper 6 will begin to close and damper 7 to open until such time as damper 6 is entirely closed and damper 7 is fully open with by-passing of secondary air in both the cold coil 3 and in the hot one 4. Subsequently, air damper 5 will start to open and air damper 7 will begin to close until air damper 5 is entirely open when air damper 7 will be completely closed. The reverse happens when air damper 5 is fully open and a lower room temperature is required.

The three air dampers 5, 6 and 7 have to be connected to one another so as to be able, by means of a single action, to pass from completely closed air damper 6 to closed position of air damper 5 and vice versa.

Use of by-pass air damper 7 permits avoiding simultaneously heating and cooling of secondary air by the same induction conditioner.

As illustrated in FIG. 2, the three air dampers 5, 6 and 7 can be replaced by two flag type air dampers and, in this case, if high room temperatures are required, air damper 6 starts to open by-pass 7 and to close passage through cold coil 3. Subsequently, when by-pass 7 is completely open, the other air damper 5 begins to close by-pass 7 and to open hot coil 4 while the reverse occurs when low room temperatures are required.

Hot coil 4 is fitted above cold coil 3 for the following reasons:

eventual condensate forming on cold coil 3 is drained into collection basin 8;

lower coil 3 is more favored from the induction point of view;

air introduced through cold coil 3 when air damper 6 is fully open is therefore more than that introduced through hot coil 4 when air damper 5 is fully open.

This arrangement gives rise to another considerable advantage afforded by the device according to this invention, i.e., that of varying the "effective" temperature by varying simultaneously the speed and relative humidity of air.

Consequently, if a high temperature is required, the dry bulb of primary-secondary air mixture increases, the number of room/hour exchanges diminishes and, consequently, body evaporation drops; the result is, therefore, a rise in "effective" temperature.

The contrary occurs when a low temperature is desired. Obviously the device according to this invention requires separate pipes for cooled and hot water and, on account of networks being separate, it is possible to make hot coil 4 with smaller surface than cold coil 3, with high temperature differentials in the coil itself, amounting to 10 or more degrees centigrade with higher temperature of incoming water, when compared with that required by two-pipe induction installations or those fitted with three pipes with servo-controlled or manual no-mixing valves as well as by the four-valve type, valves being two-way servo-controlled, fitted with thermostatic valves or others. With such high differentials of temperature it is possible to reduce delivery of hot piping to very low values which is impossible in the case of other induction type systems. Consequently the weight of hot piping is greatly reduced in comparison with that of cold piping.

The advantages of the device according to this invention in comparison with the two-pipe type are:

(1) Elimination of zoning of primary air as well as that of secondary water, inasmuch as inductor unit can supply either cooled or heated secondary air;

(2) Flexibility of performance which is particularly useful in intermediate seasons when instability of atmospheric conditions requires frequent sudden changes from cooling cycle to heating cycle and vice versa;

(3) Elimination of seasonal passage or change inasmuch as primary air is always sent at the temperature of 10—12° C. and because either cold or hot water alone circulates continuously in local coils. This fact is particularly evident in connection with local automatic adjustment for simplification of room thermostats;

(4) Constant delivery in secondary water circuit;

(5) Elimination of local adjustment valves appertaining to water in secondary circuit, viz., both manual valves and automatic ones, with consequent reduced maintenance;

(6) Simplification of calculation system relating to primary air volumes as it is sufficent for primary air to be in such quantity as to remove heat latent in room or to ensure recognized physiologically necessary exchange;

(7) Lower volumes, consequent on point (6), of primary air with consequent saving on central conditioner and on air distributor network;

(8) In the case of local automatic adjustment, cost of apparatus is lower, room thermostat is of the simple type instead of seasonal inversion, and a servo-control common to both air dampers is fitted in place of a two or three-way servo-controlled valve.

The advantages of the device according to this invention in comparison with the three-pipe system are:

(1) There is no possibility of hot water mixing with cooled water in return piping and consequently operational costs are lower;

(2) It is not necesary to zone the secondary water circuits and, consequently, conditioning is simpler and a number of pumps and respective accessories is reduced;

(3) Considerable reduction, consequent on point (2), of central automatic adjustment;

(4) Constant delivery in secondary water circuits with consequent elimination of all controls required to maintain pressure constant with delivery variations;

(5) Considerable reduction of initial cost of unit consequent on points (2), (3) and (4);

(6) Elimination of all local adjustment valves in secondary water circuit: this includes manual and automatic valves and reduces maintenance;

(7) Reduced necessity of local automatic adjustment as induction units can be satisfactorily adjusted by hand;

(8) Lower cost of local automatic adjustment as it is necessary in the case of each unit to have a single servo-control in place of a servo-controlled valve.

Installation cost of a unit according to this invention can obviously be compared only with that of a three-pipe system.

In order to better understand the connection system of coils to secondary circuit water distribution networks, reference is made to FIG. 3.

Diagrams of FIG. 3 and FIG. 4 show that the three pipe system (on the left) requires twelve unions, one for each of points 10, 15 and 16, i.e., two for each of valves 11, 13, 14 and three for valve 12 in order to connect the thermic exchange coil of local induction conditioner to secondary water circuit and that, in the same way, as shown in FIG. 4, twelve unions, one for each of points 17, 19, 23 and 24 and two for each of valves 18, 20, 21 and 22 are required to connect thermic exchange coils 3 and 4 to secondary hot and cold water networks according to the system used in the case of this invention. Between the two systems there is, therefore, no difference in cost with regard to hydraulic connections of local units to secondary water networks.

It must be borne in mind that, for reasons of constancy of delivery in coils, in two or three-pipe induction systems it is necesary to bring the hot water to a temperature of 40—45° C. with a maximum differential of 3—4° C. between inlet and outlet of inductor unit coil.

By using the device according to this invention it is, on the other hand, possible to increase both temperature of hot water and temperature differential in such a way as to reduce hot secondary circuit delivery to the value of ⅓—¼ in respect of cold delivery and this, consequently, with a negligible increase in weight of pipes in comparison with the three-pipe system.

Eventual higher cost of pipe is, however, more than compensated by lower cost of automatic adjustment, both local and central.

Variations and modifications may be made to this invention by experts without departing from the field of the aforesaid invention.

I claim:

1. An induction air conditioning system comprising a housing defining a chamber, at least two heat exchange means associated with said housing in parallel arrangement with respect to said housing, and individual port means provided in said housing for each heat exchange means permitting the parallel inflow of ambient air to said heat exchange means, one of said heat exchange means having cold water inlet and cold water outlet and the other of said heat exchange means having warm water inlet and warm water outlet, said chamber being provided with a primary air inlet and a conditioning air outlet, the structure being so arranged that the flow of primary air within said chamber induces parallel secondary flow of ambient air through said heat exchange means, which secondary air thereafter mixes with said primary air, and means for controlling the rate of secondary air flow through each heat exchange means.

2. An induction air conditioning system according to claim 1, wherein the water supply circuits to said hot and cold heat exchange means are completely separate from each other.

3. An induction air conditioning system according to claim 1, wherein said means for controlling the secondary air flow from each heat exchange means comprises air damper means arranged adjacent to said hot and cold heat exchange units.

4. An induction air conditioning system according to claim 1, wherein air damper means is provided to prevent the flow of secondary air through at least one of said heat exchangers at all times, thereby preventing the simultaneous introduction of hot and cold secondary air into said chamber.

5. An induction air conditioning system according to claim 1, wherein said chamber is provided with nozzles adapted for having said primary air introduced therethrough, said nozzles being of annular cross-section thereby inducing an increased flow of secondary air into said chamber.

References Cited

UNITED STATES PATENTS

| | | | |
|---|---|---|---|
| 2,492,757 | 12/1949 | Meek | 165—123 X |
| 3,147,797 | 9/1964 | Miner | 165—22 |
| 3,176,759 | 4/1965 | Windham | 165—22 |
| 3,208,508 | 9/1965 | Bryans | 165—123 X |

ROBERT A. O'LEARY, *Primary Examiner.*

T. W. STREULE, *Assistant Examiner.*